(12) United States Patent
Hazan

(10) Patent No.: US 10,529,380 B2
(45) Date of Patent: Jan. 7, 2020

(54) METHOD AND SYSTEM FOR CREATING A COMPREHENSIVE PERSONAL VIDEO CLIP

(71) Applicant: Nir Hazan, Tel Aviv (IL)

(72) Inventor: Nir Hazan, Tel Aviv (IL)

( * ) Notice: Subject to any disclaimer, the term of this patent is extended or adjusted under 35 U.S.C. 154(b) by 0 days.

(21) Appl. No.: 15/979,491

(22) PCT Filed: Nov. 23, 2016

(86) PCT No.: PCT/IB2016/057059
§ 371 (c)(1),
(2) Date: May 15, 2018

(87) PCT Pub. No.: WO2017/089968
PCT Pub. Date: Jun. 1, 2017

(65) Prior Publication Data
US 2019/0005982 A1 Jan. 3, 2019

Related U.S. Application Data

(60) Provisional application No. 62/259,154, filed on Nov. 24, 2015.

(51) Int. Cl.
*G11B 27/036* (2006.01)
*H04N 5/91* (2006.01)
(Continued)

(52) U.S. Cl.
CPC ........ *G11B 27/036* (2013.01); *G06F 16/7867* (2019.01); *G06K 7/1417* (2013.01);
(Continued)

(58) Field of Classification Search
CPC ............ G11B 27/036; G11B 20/10527; G11B 27/034; G11B 27/105; G11B 27/28;
(Continued)

(56) References Cited

U.S. PATENT DOCUMENTS

| 8,374,421 B1* | 2/2013 | Hickman | B25J 9/1697 |
| | | | 318/568.12 |
| 2010/0230946 A1* | 9/2010 | Kanda | B42D 15/0093 |
| | | | 283/85 |

(Continued)

*Primary Examiner* — Mishawn N. Hunter
(74) *Attorney, Agent, or Firm* — Haim M. Factor; 1st-Tech-Ideas

(57) ABSTRACT

A method of analyzing and presenting at least one video of a user in a comprehensive personal clip of the user's participation in an event, the method comprises providing users of the event with an identification sign, the identification sign comprises at least one unique two-dimensional (2D) barcode pattern and at least one predesigned common pattern; creating a lookup table of users' IDs, each user's ID being associated with the user's unique 2D barcode pattern; receiving at least one video of the event; extracting sample frames from the at least one video of the event in an initial predetermined rate; detecting and identifying at least one unique 2D barcode pattern in the sample frames and creating a time appearance index representing at least one user's at least one video segment, according to the at least one identified unique 2D barcode pattern; editing at least one of the at least one video segment that features at least one of the users based on the time appearance index; and integrating the at least one video segment into a comprehensive personal clip.

14 Claims, 13 Drawing Sheets

(51) Int. Cl.
    *G06K 9/18* (2006.01)
    *G06K 9/20* (2006.01)
    *H04N 5/77* (2006.01)
    *G11B 27/034* (2006.01)
    *G11B 27/28* (2006.01)
    *G11B 27/10* (2006.01)
    *G06F 16/78* (2019.01)
    *G06K 7/14* (2006.01)
    *G06K 19/06* (2006.01)
    *G11B 20/10* (2006.01)
    *G06K 9/00* (2006.01)

(52) U.S. Cl.
    CPC ............. *G06K 9/18* (2013.01); *G06K 9/2063* (2013.01); *G06K 19/06037* (2013.01); *G11B 20/10527* (2013.01); *G11B 27/034* (2013.01); *G11B 27/105* (2013.01); *G11B 27/28* (2013.01); *H04N 5/77* (2013.01); *H04N 5/91* (2013.01); *G06K 9/00221* (2013.01)

(58) Field of Classification Search
    CPC .... G06F 16/7867; G06K 7/1417; G06K 9/18; G06K 9/2063; G06K 19/06037; H04N 5/77; H04N 5/91
    See application file for complete search history.

(56) References Cited

U.S. PATENT DOCUMENTS

| | | | |
|---|---|---|---|
| 2011/0052154 A1* | 3/2011 | Weber ................. | G11B 27/034 386/280 |
| 2012/0162436 A1* | 6/2012 | Cordell ................ | G11B 27/034 348/158 |
| 2013/0039545 A1* | 2/2013 | Kovtun .............. | G06K 9/00288 382/104 |
| 2013/0238709 A1* | 9/2013 | Martin ................. | G06Q 30/02 709/204 |
| 2014/0172474 A1* | 6/2014 | Partridge ............... | G06Q 10/02 705/5 |
| 2016/0006946 A1* | 1/2016 | Cohen ................. | G06F 19/326 348/660 |
| 2016/0035143 A1* | 2/2016 | Hansen ............. | H04N 1/00342 348/157 |

* cited by examiner

| Participant ID | Video ID | Starting second | End second | Lat/Long/Alt |
|---|---|---|---|---|
| 12345 | 1234 | 1000 | 1025 | 23.45678/34.56789/100 |
| 23456 | 2345 | 2000 | 2022 | 12.45678/56.56789/200 |

Fig. 8

METHOD AND SYSTEM FOR CREATING A COMPREHENSIVE PERSONAL VIDEO CLIP

CROSS-REFERENCE TO RELATED PATENT APPLICATIONS

This patent application claims priority from and is related to U.S. Provisional Patent Application Ser. No. 62/259,154, filed 24 Nov. 2015, this U.S. Provisional patent application incorporated by reference in its entirety herein.

FIELD OF THE INVENTION

The present invention relates to the field of video clips creation and more specifically to creating a comprehensive personal clip of a user participating in an event.

BACKGROUND

Large events such as sports events are often filmed in order to be documented and replayed. As technology develops, users or participants such as runners are searching for an easy and automatic way to receive their photos and videos. Existing systems often demand a great deal of effort from the photographers capturing/filming the event, the user who wishes to receive his photos/video clips and/or expensive and cumbersome equipment such as personal timing chips and heavy chip detectors in order to do the task.

There is a need for a system and method enabling to capture and/or film a large number of participants, automatically analyze and extract photos and videos of each participant and automatically generate a personalized comprehensive video clip and/or a photo album for each participant whilst enabling photographers of the event the freedom to capture/film anywhere in the event area and unchaining them from standing only near the heavy traditional chip detectors.

SUMMARY OF THE INVENTION

According to an aspect of the invention, there is provided a method of analyzing and presenting at least one video of a user in a comprehensive personal clip of the user's participation in an event, the method comprises: providing users of the event with an identification sign, the identification sign comprises at least one unique two-dimensional (2D) barcode pattern and at least one predesigned common pattern; creating a lookup table of users' IDs, each user's ID being associated with the user's unique 2D barcode pattern; receiving at least one video of the event; extracting sample frames from the at least one video of the event in an initial predetermined rate; detecting and identifying at least one unique 2D barcode pattern in the sample frames and creating a time appearance index representing at least one user's at least one video segment, according to the at least one identified unique 2D barcode pattern; editing at least one of the at least one video segment that features at least one of the users; and integrating the at least one video segment into a comprehensive personal clip; wherein the steps of creating, extracting, detecting and identifying, editing and integrating are performed by at least one processor unit.

The unique 2D barcode pattern may comprise a unique combination of pixels for each of the users participating in the event.

The predesigned common pattern may comprise a bright frame and a dark frame.

The predesigned common pattern may comprise orientation marks.

The orientation marks may comprise a top right white pixel, a top left white pixel, a bottom left white pixel and a bottom right black pixel.

The editing may comprises adding at least one extra frame at at least one of the beginning and end of at least one of the at least one video segment.

The editing may comprise cutting at least one frame from at least one of the beginning and end of at least one of the at least one video segment.

The editing may comprise enlarging a determined area of at least one of the at least one video segment.

The comprehensive personal clip may comprises a template.

The template may comprise at least one generic video and at least one placeholder.

The integration of the at least one video segment may comprises integrating the at least one video segment into the at least one placeholder.

The editing may comprise finding a frame where background pixels appear the least and wherein the integrating may comprise integrating the frame and frames spanning the placeholder before and after the frame.

The editing may comprise finding a frame where the unique 2D barcode pattern appears the largest and wherein the integrating may comprise integrating the frame and frames spanning the placeholder before and after the frame.

The integrating may comprise integrating at least one of the user's social network user name and photo, photos from the event, speed and area map.

The predetermined rate may be changed.

The predetermined rate may be lowered if in the step of detecting and identifying no identification sign has been detected in at least five consecutive sample frames.

The creation of a time appearance index may comprise determining whether a frame belongs to an existing video segment or should be part of a new video segment.

The method may further comprise calculating a user's speed based on the sizes of the user's unique 2D barcode pattern in at least two consecutive detected frames.

According to another aspect of the present invention, there is provided a method of analyzing and presenting at least one video of a user in a comprehensive personal clip of the user's participation in an event, the method comprises: providing by the user a file comprising at least locations and time stamps; matching the user's locations and time stamps with locations and time stamps of at least one camera filming the event; creating a time appearance index representing at least one user's at least one video segment according to the user's locations and time stamps and the at least one camera's locations and time stamps; editing at least one of the at least one video segment that features the user; and integrating the at least one video segment into a comprehensive personal clip; wherein the steps of associating, creating, editing and integrating are performed by at least one processor unit.

The editing may comprise adding at least one extra frame at at least one of the beginning and end of at least one of the at least one video segment.

The editing may comprise cutting at least one frame from at least one of the beginning and end of at least one of the at least one video segment.

The comprehensive personal clip may comprise a template.

The template may comprise at least one generic video and at least one placeholder.

The integration of the at least one video segment may comprise integrating the at least one video segment into the at least one placeholder.

The integrating may comprise integrating at least one of the user's social network user name and photo, photos from the event, speed and area map.

According to another aspect of the present invention, there is provided a method of analyzing and presenting at least one video of a user in a comprehensive personal clip of the user's participation in an event, the method comprises: extracting sample frames from at least one video of the event in an initial predetermined rate; retrieving known photos of the participant and analyzing the participant's face characteristics; using face detection and recognition, detecting and associating each participant's at least one detected frame with his ID/name; creating a time appearance index representing at least one user's at least one video segment; editing at least one video segment that features the user; and integrating the at least one video segment into a comprehensive personal clip; wherein the steps of associating, creating, editing and integrating are performed by at least one processor unit.

The editing may comprise adding at least one extra frame at at least one of the beginning and end of at least one of the at least one video segment.

The editing may comprise cutting at least one frame from at least one of the beginning and end of at least one of the at least one video segment.

The comprehensive personal clip may comprise a template.

The template may comprise at least one generic video and at least one placeholder.

The integration of the at least one video segment may comprise integrating the at least one video segment into the at least one placeholder.

The integrating may comprise integrating at least one of the user's social network user name and photo, photos from the event, speed and area map.

The detecting and associating may comprise comparing photos of participants to video frames.

The method may further comprise: presenting the user with at least one of the retrieved photos; and asking the user to identify himself in the at least one of the retrieved photos.

BRIEF DESCRIPTION OF THE DRAWINGS

For better understanding of the invention and to show how the same may be carried into effect, reference will now be made, purely by way of example, to the accompanying drawings.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings:

FIG. 8 is an illustration of an exemplary time appearance index table, according to some embodiments of the invention;

DETAILED DESCRIPTION OF PREFERRED EMBODIMENTS

Figure 1:
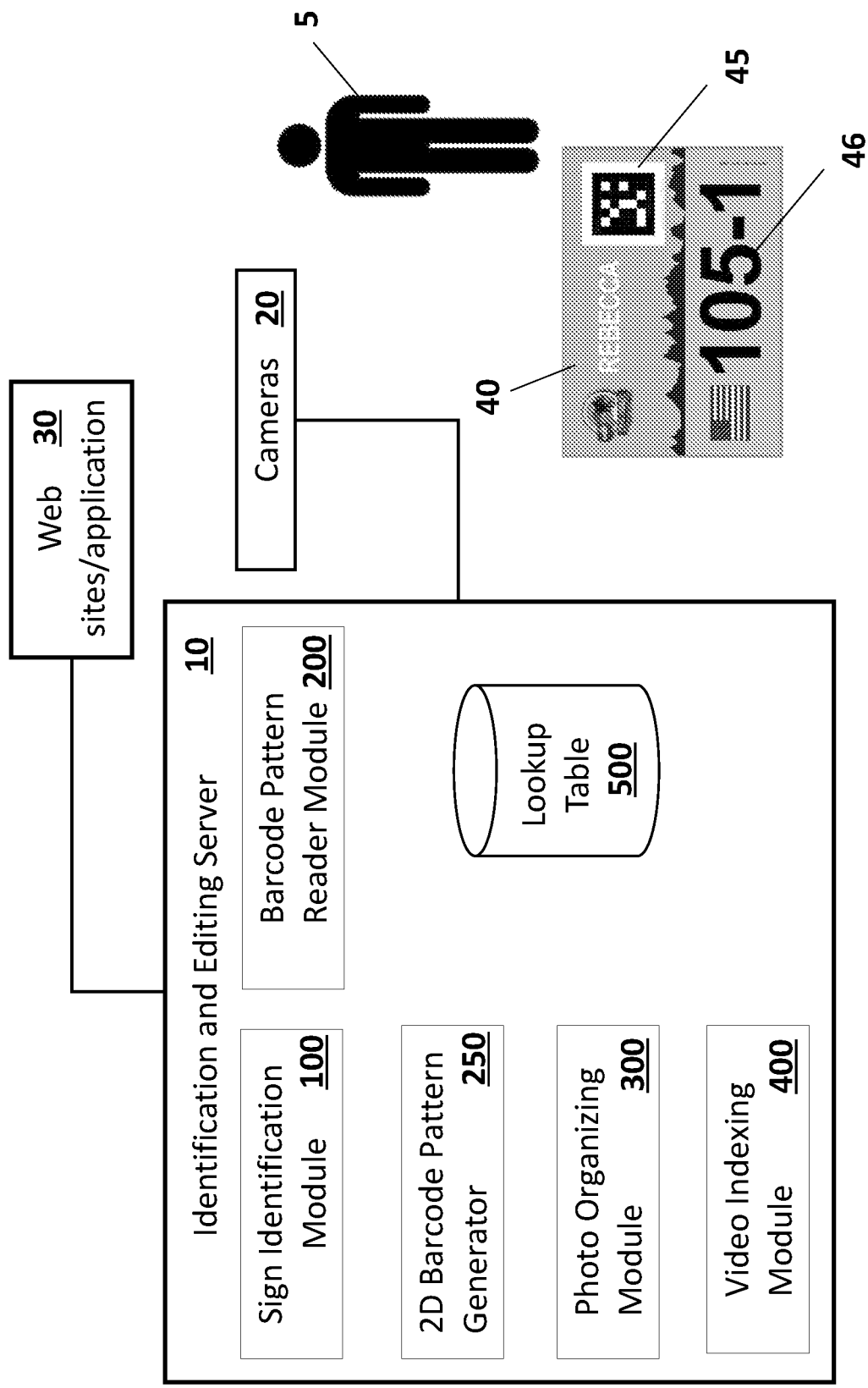
FIG. 1 is a block diagram illustrating a system for identification of participants in events, according to some embodiments of the invention.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

The present invention provides a system and method for analyzing and creating videos of participants in a comprehensive personal clip of the user's participation in an event. According to embodiments of the invention, participants have an identification sign which includes at least one two-dimensional (2D) barcode pattern and at least one predesigned common pattern enabling to pinpoint the identification sign of the participant appearing in the videos. Each participant is associated with a barcode in a lookup table of participants' IDs in order for the system to be able to recognize his video segments. Upon request for a clip, the system creates a video clip of the user (participant) participating in the event.

The present invention provides an identification sign having a frame of a first color such as a white frame, a background of a different color such as a black background (common pattern) and a two dimensional (2D) barcode pattern of a color that is different than that of the background such as white. The 2D barcode pattern is unique to each participant of the event. The terms 2D barcode pattern or unique 2D barcode pattern may be shortly referred to in this document as "barcode pattern" or simply as "pattern". It will be appreciated that the present invention is not limited to a 2D barcode pattern and any barcode, QR code, data matrix, code, pattern, etc. may be used. The barcode pattern of each participant is formed from a combination of blocks (pixels) printed in large scale having a small number of large pixels, so it can be identified in photos and videos taken from a long distance.

The present invention provides a solution for identifying participants in large events e.g. sports events, by providing each participant with a printed sign e.g. printed over a wearable object worn by the participant, such as a shirt, a neck badge, a hat, a bike helmet, etc. for identifying the particular participant. Photos and videos of the event are gathered or received in real time and processed in a designated computer device for detecting the identification sign worn by each of the participants in photos or videos of the sports event. The barcode of the participant(s) is identified from those photos or videos in real time or after the event, where each specific participant is identified by identifying the 2D barcode pattern of each identified identification sign of each participant. The identification is done by comparing the identified barcode pattern with a predefined database associating each specific 2D barcode pattern with a specific participant. This means that the identification process may include two steps: a first step of identifying the identification sign within the image or video of the event and a second step of identifying the unique 2D barcode sign within the identification sign for ultimately identifying the participant within the image/video.

It will be appreciated that the identification process is not limited to include two steps. According to embodiments of the invention, the identification sign and the unique 2D barcode pattern may be identified together.

FIG. 1 is a block diagram illustrating a system for identification of participants in events, according to some embodiments of the invention. The system includes an identification and editing server 10 in association with cameras 20 photographing or filming the area of the event and with at least one web site and/or application 30. The identification and editing server 10 comprises at least one processor for performing the method of the present invention. In this example, each participant 5 of the event wears an object 40 such as a shirt, a hat, a neck badge, a bike helmet, a shirt sticker, etc. having the identification sign 45 printed thereover or attached thereto. Each identification sign 45 of each participant 5 includes a unique 2D barcode pattern for the specific participant 5. The identification server 10 receives and scans photos and/or video images received from one or more of cameras 20 capturing or filming the event and identifies the participants 5 in each received photo or video. Each participant wears a wearable object 40 which includes one or more identical identification signs 45. The identification sign 45 is associated with a specific participant identity using a look up table (e.g. in a designated database) 500. The identification server 10 comprises a sign identification module 100 for identifying at least one identification sign appearing in each received image or frame, a barcode pattern reader module 200 for reading the barcode pattern in each identified identification sign in each image or frame; a 2D barcode pattern generator module 250 for generating barcode patterns to the specific participants of each specific event using predefined generation rules for minimizing identification errors. The server 10 further comprises a photo organizing module 300 and a video indexing module 400. The photo organizing module 300 may be configured to associate images of each participant according to the 2D barcode pattern thereof that was identified using the lookup table 500 and optionally organize the photos in an album or a social network page e.g. a Facebook™ page. The Video indexing module 400 edits video segments out of the received event's videos, for each participant, based on the barcode pattern identification.

It will be appreciated that the camera(s) of the present invention may be places anywhere in the event, in any weather condition, fixed or in motion and is (are) not dependent on any other expensive and cumbersome electronic equipment such as traditional ground mounted or overhead timing chip detectors.

Figure 2:
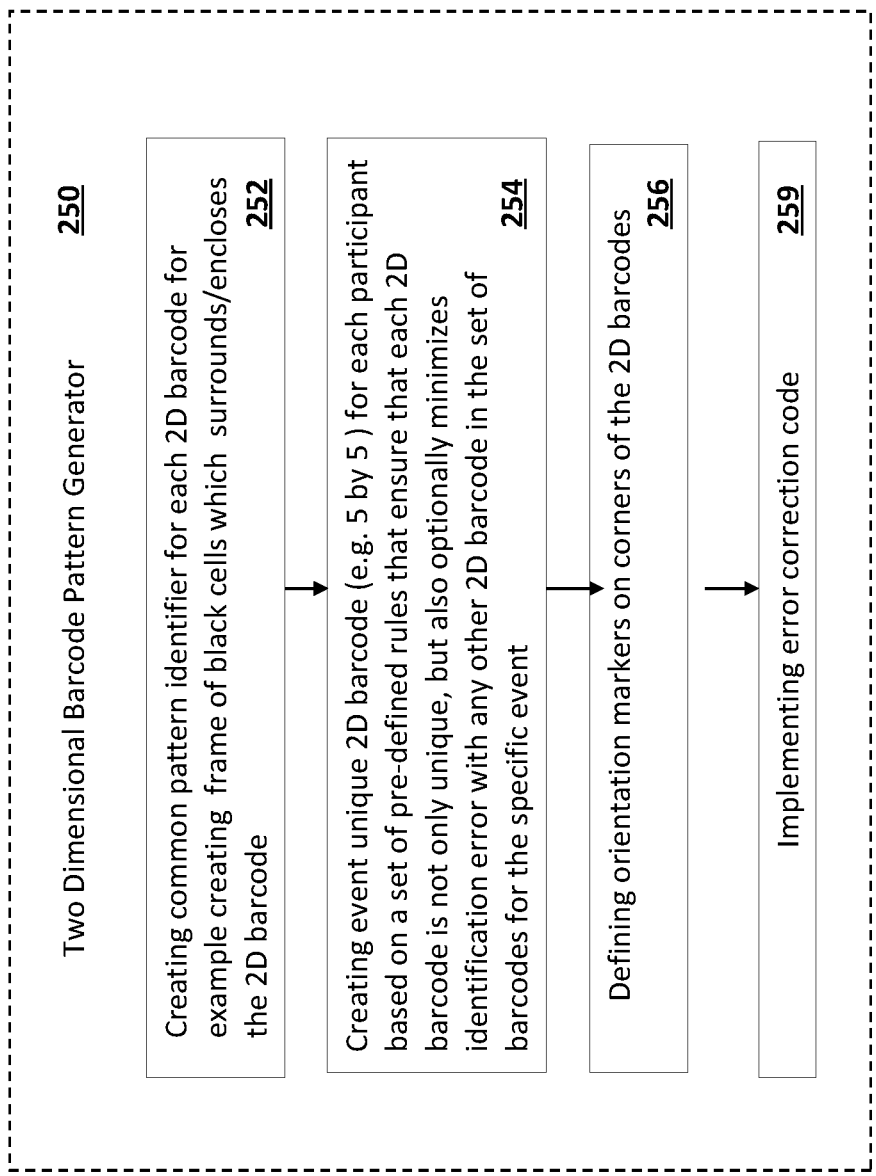
FIG. 2 is a flow chart, illustrating the operational steps of the 2D barcode pattern generator module, according to some embodiments of the invention.

FIG. 2 is a flow chart illustrating the operational steps of the 2D barcode pattern generator module 250, according to some embodiments of the invention. The process carried out by the 2D barcode pattern generator module comprises the following steps: Creating common pattern identifier for each identification sign, for example creating two frames, an outer frame of white cells and inner frame of black cells which surround/enclose the 2D barcode pattern (step 252); creating event Unique 2D barcode pattern (e.g. 5 by 5) for each participant based on a set of pre-defined rules that optionally ensure that each barcode pattern is not only unique, but also created to minimize identification error with any other barcode pattern in the set of barcode patterns for the specific event (step 254), defining orientation markers on the corners of the identification sign as part of the common pattern (step 256), for example, all the identification signs of a specific event include a top right white pixel, a top left white pixel, a bottom left white pixel and a bottom right black pixel such as presented for example in FIG. 7; and implementing an error correction code such as Hamming Error code (https://en.wikipedia.org/wiki/Hamming_code) (step 259) intended to identify an identification sign which was not captured properly. The identification sign comprises a bright frame, a dark frame and a bright inner 2D barcode pattern, for example, a white frame, a black frame and an inner 2D barcode pattern. The barcode pattern is printed in large scale with low resolution (e.g. 2×2-9×9 cm) so it can be identified in a photo or video image by the server modules even when taken (filmed or captured) from great distance.

Figure 3:
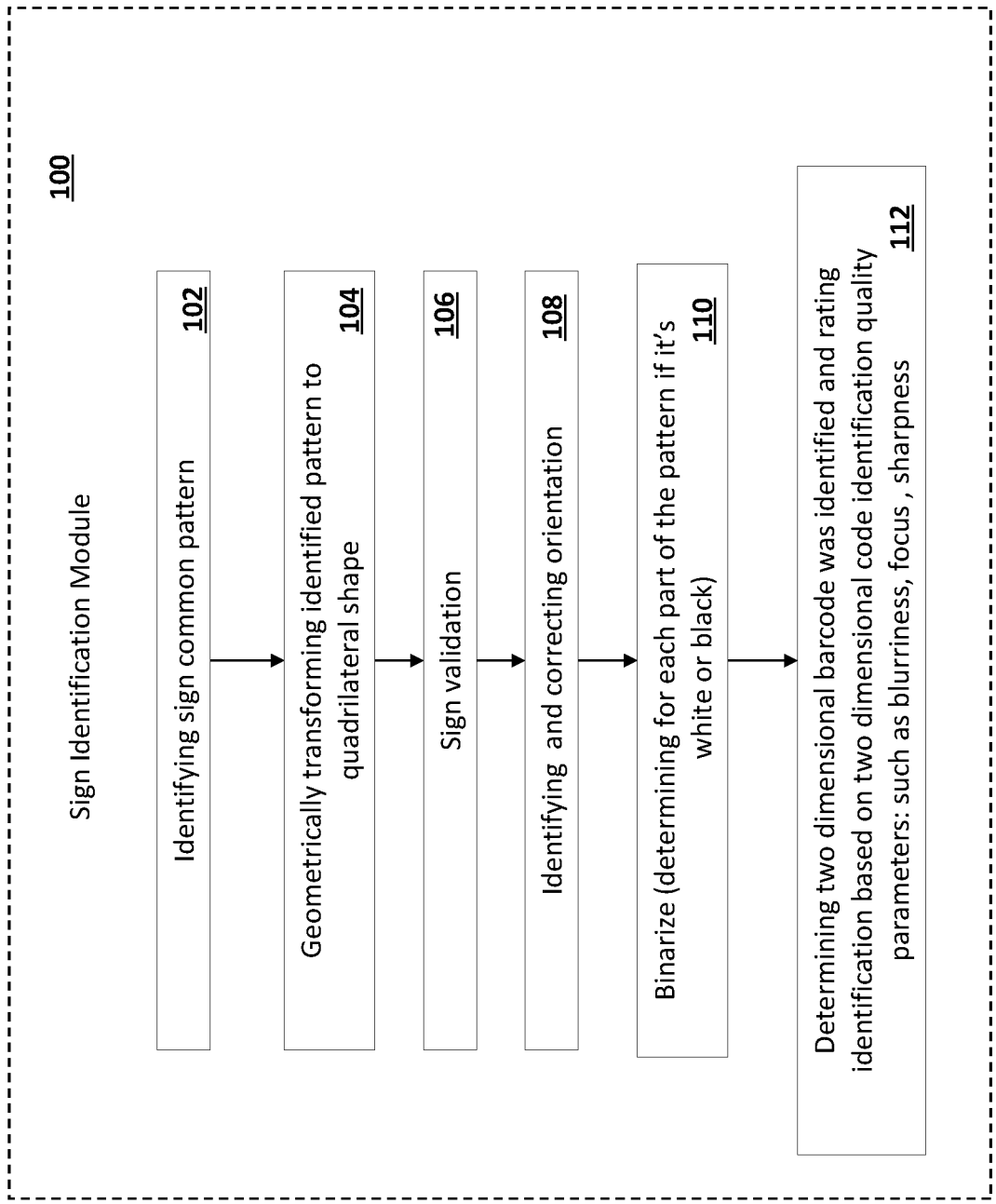
FIG. 3 is a flow chart illustrating the operational steps of the sign identification module, according to some embodiments of the invention.

FIG. 3 is a flow chart illustrating the operational steps of the sign identification module 100, according to some embodiments of the invention. This process includes the following steps: identifying sign common pattern (step 102); optionally, geometrically transforming identified sign to a quadrilateral shape (For example, http://www.aforgenet.com/framework/docs/html/7039a71d-a87d-47ef-7907-ad873118e374.htm), this is required when the identification sign is captured at an angle causing the identification sign to have a non quadrilateral shape (step 104); sign validation ensuring this sign is in the specific known format designed for the local two dimensional barcode (step 106), identifying orientation and correcting according to predefined rules e.g. black cell at the bottom right corner (step 108), binarizing the barcode by transforming any pixel in the identified barcode to white or black, for example, using http://www.aforgenet.com/framework/features/adaptive_binarization.html (step 110) or by, for example, calculating a histogram and selecting threshold accordingly, etc. and then determining for each of the pixels (e.g. 25) whether it is white or black; at the end of this process determining whether the two dimensional barcode pattern was identified and assigning a rating of the identification based on quality parameters assigned to the specific identification sign and barcode pattern thereof (step 112), such as blurriness, focus, sharpness, etc. It will be appreciated that at least some of the steps may be performed in a different order.

Figure 4:
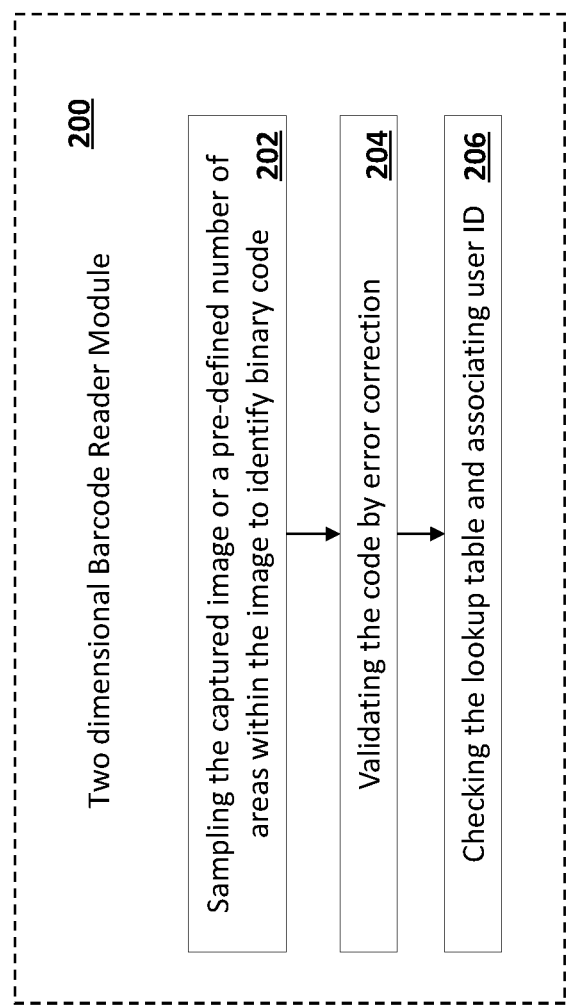
FIG. 4 is a flow chart illustrating the operational steps of the 2D barcode pattern reader module, according to some embodiments of the invention.

FIG. 4 is a flow chart illustrating the operational steps of the 2D barcode pattern reader module 200, according to some embodiments of the invention. This process includes the following steps: sampling the captured image or video frame, or a pre-defined number of areas within the image or frame to identify binary code (step 202), validating of the barcode by an error correction algorithm e.g. Hamming Error code (step 204), and checking the lookup table 500 for associating user ID (step 206).

Figure 5:
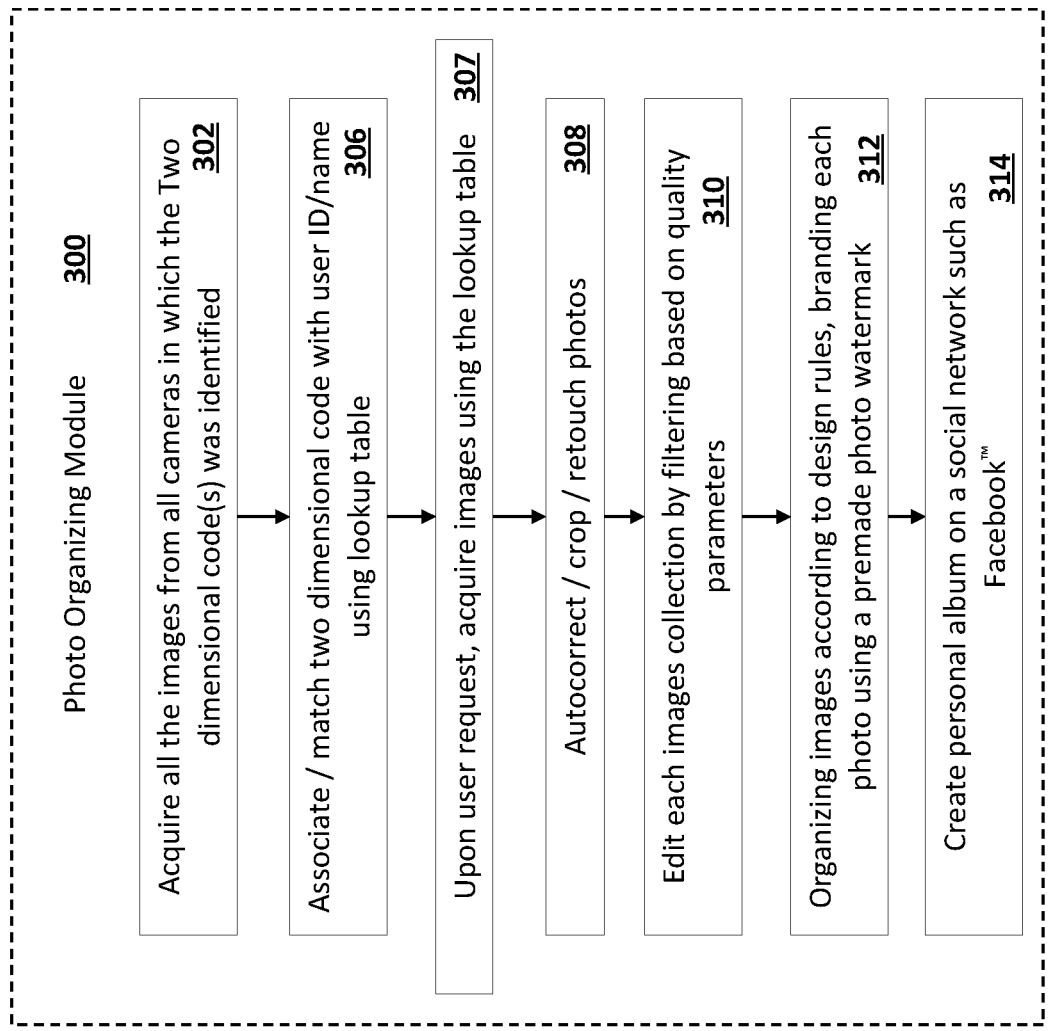
FIG. 5 is a flow chart illustrating the operational steps of the photo organizing module, according to some embodiments of the invention.

FIG. 5 is a flow chart illustrating the operational steps of the photo organizing module 300, according to some embodiments of the invention. This process includes the following steps: acquiring from all the cameras all images in which the identification sign(s) was(were) identified (step 302); associating the identified 2D barcode pattern(s) thereof with user ID/name according to the look up table 500 (step 306); upon user request acquiring images by associating two dimensional barcode pattern to participant ID using the lookup table (step 307); optionally autocorrecting and cropping images (step 308); editing each image collection by filtering images based on predefined filtering rules e.g. by using the identified detection quality parameters of the 2D barcode pattern (step 310); organizing images according to pre-defined design rules (e.g. overlay, brightness, contrast, etc.) and branding each image using a premade photo watermark (step 312) and optionally creating a personal photo album on a social network page such as Facebook™ (step 314).

Figure 6:
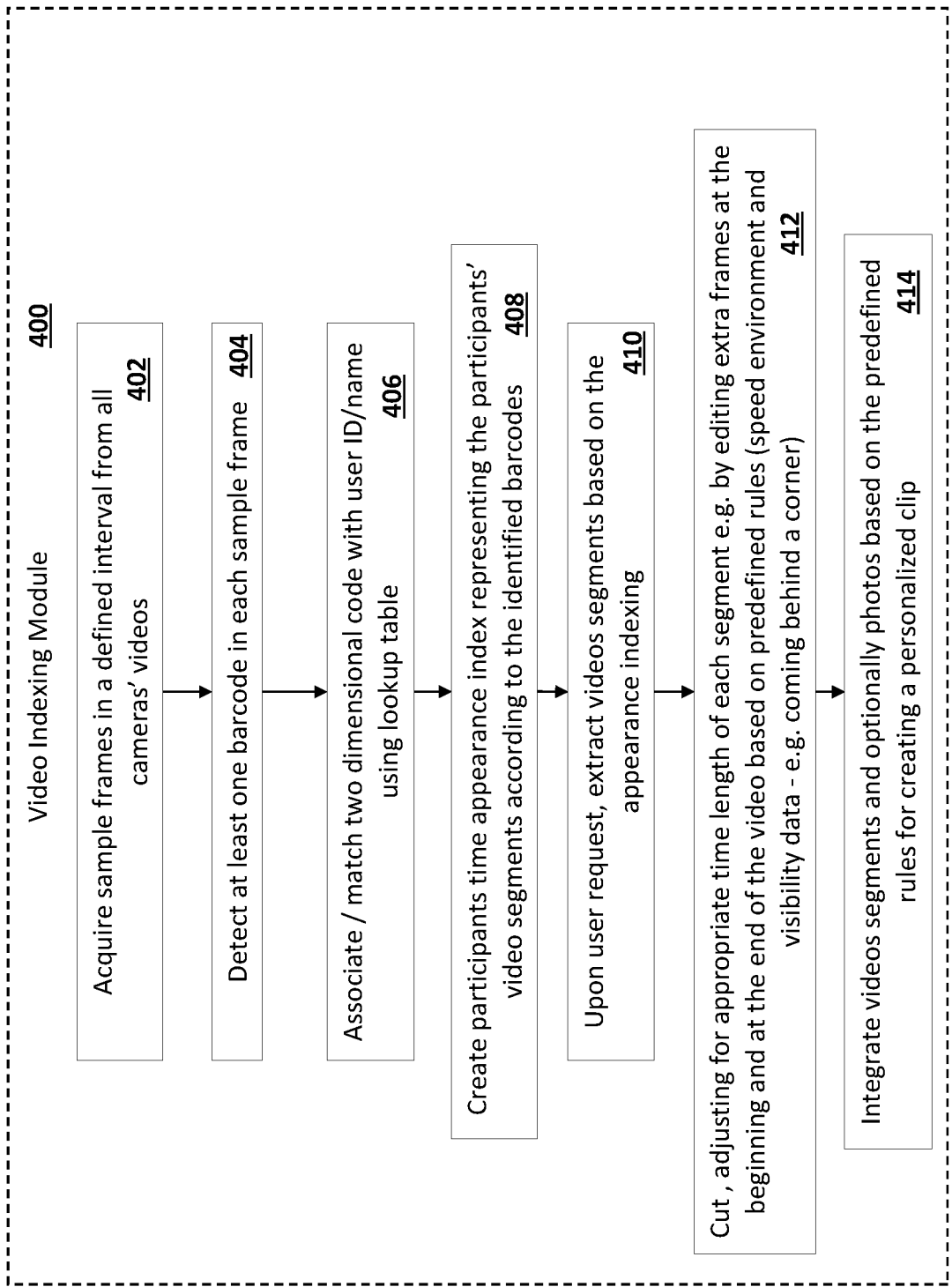
FIG. 6 is a flow chart illustrating the operational steps of the video indexing module, according to some embodiments of the invention.

FIG. 6 is a flow chart illustrating the operational steps of the video indexing module 400 according to some embodiments of the invention. This process includes the following steps: acquiring sample frames in a defined interval from the cameras' videos (step 402), detecting and reading the 2D barcode pattern of at least one identification sign in each frame of the sample (step 404) (see FIGS. 3 and 4); associating and matching the two dimensional barcode pattern with user/participant ID/name using the lookup table (step 406), creating participants time appearance index representing the participants' video segments according to identified barcode patterns (step 408) (see in FIG. 8 is an example of the indexing); Upon request of a user (participant) to create his video clip, extracting video segments based on the index (step 410); cutting and adjusting for appropriate time length for each segment by adding extra frames at the beginning and the end of the video based on predefined timing rules, considering speed of the participant and environment characteristics, such as participant appearing behind the corner (412) (this is required in some cases, when the person may appear in the video before the two dimensional barcode pattern was identified and may keep appearing after the barcode pattern was no longer identified) e.g. the barcode is somehow blocked from the camera's view; and integrating video segments and optionally photos/images based on the predefined rules to create a personalized edited clip (step 414).

According to embodiments of the invention, the system may be configured to decide whether a detected frame belongs to an existing video segment or whether to start a new video segment based on a predetermined number of framed in which the user does not appear.

According to embodiments of the invention, when a participant wishes for the system to create his clip, he may register using Facebook™ by providing the identification number (46 of FIG. 1) associated with his barcode. The system locates the user's video segments and integrates them in a video clip template. The video clip template may be prepared for each event or may be intended to allow modification as necessary. Each template may comprise generic parts which appear in each user's video clip and at least one "placeholder" (empty part) for the system to integrate the user's personal video segment(s) into. The generic parts are video clips in which the user does not necessarily appear. According to embodiments of the invention, the "placeholder" size may be fixed or dynamic. The system makes smart automatic decisions as per how to fit the user's video segments into the placeholder(s). For example, if the "placeholder" length is nine seconds and the user's video segment length is e.g. six seconds, the system may pad the extra three seconds with another video segment of the user or with a generic content. In another case where the "placeholder" length is e.g. nine seconds and the user's video segment length is e.g. fifteen seconds, the system may, for example:

Cut the first six seconds of the segment;

Cut the last six seconds of the segment;

Find the frame within the segment where the user's barcode appears the largest and use the frames spanning four and a half seconds before and after it;

Find the frame where background e.g. the sky's pixels appear the least, namely, the user's body is the biggest, thus covering part of the sky's pixels, and use the frames spanning four and a half seconds before and after this frame;

Use the nine consecutive seconds having the highest detection score, etc.

In a case where a face detection and recognition process is being used as described below, find the frame where the user's face is in best position e.g. a frame where the user is smiling, his eyes are wide open, etc. and use the frames spanning four and a half seconds before and after this frame.

According to embodiments of the invention, the system holds information regarding the chronological order of the segments in order to avoid cases where the video clip is created using a later segment before an earlier one.

According to embodiments of the invention, the system may enlarge a determined area of the video segment in order to zoom in on the user appearing in this area.

According to embodiments of the invention, the system may also integrate into the video clip the user's name and photo fetched from the user's Facebook™ page, photos of the user from the event, speed and area map.

According to embodiments of the invention, the system may calculate a user's speed based on the sizes of the user's unique 2D barcode pattern in at least two consecutive detected images and/or frames.

In the process of creating each video segment, the system samples the cameras' videos every predetermined time period, e.g. 1 second. According to embodiments of the invention, the system may automatically change the sampling rate. For example, if the system does not recognize any barcode in a number of frames (e.g. 5 frames), it may lower the sampling rate (e.g. every 2 seconds) and so on. When the system recognizes a barcode in the frame it may return to its original sampling rate.

According to embodiments of the invention, instead of or in addition to the sign identification module 100, the barcode pattern reader module 200 and the 2D barcode pattern generator 250, the system may use, for the process of recognizing the participants, a file provided by the participant who wishes for the system to create his video clip. This file may be generated by a designated application such as, for example, RunKeeper™ (https://runkeeper.com/) and includes the participant's chronological locations and time stamps (e.g. Runner_1.gpx). Once the participant provides this file to the system, the photo organization module 300A and the video indexing module 400A may use this file for recognizing the participant instead or in addition to the recognition using his barcode.

Figure 9:
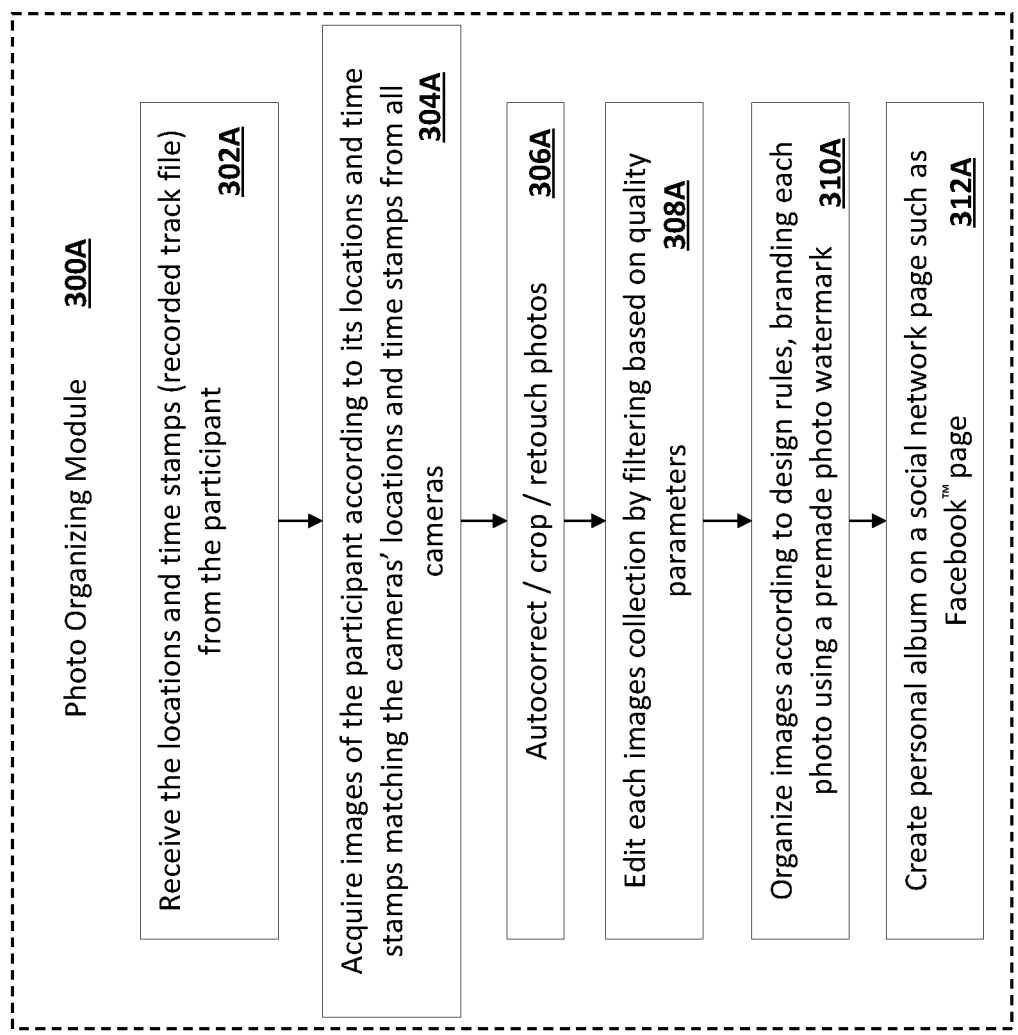
FIG. 9 is a flow chart illustrating the operational steps of an additional or alternative photo organizing module processing, according to some embodiments of the invention.

FIG. 9 is a flow chart illustrating the operational steps of an additional or alternative photo organizing module 300A according to some embodiments of the invention. This process includes the following steps: receiving locations and time stamps file(s) from the participant (302A); Acquiring all the images from all cameras of the participant according to his locations and time stamps and the cameras' locations and time stamps (304A); optionally autocorrecting and cropping images (step 306A); editing each images collection by filtering images based on predefined filtering rules (step 308A); organizing images according to pre-defined design rules and branding each image using a premade photo watermark (step 310A) and optionally creating a personal photo album on a social network page such as Facebook™ (step 312A).

Figure 10:
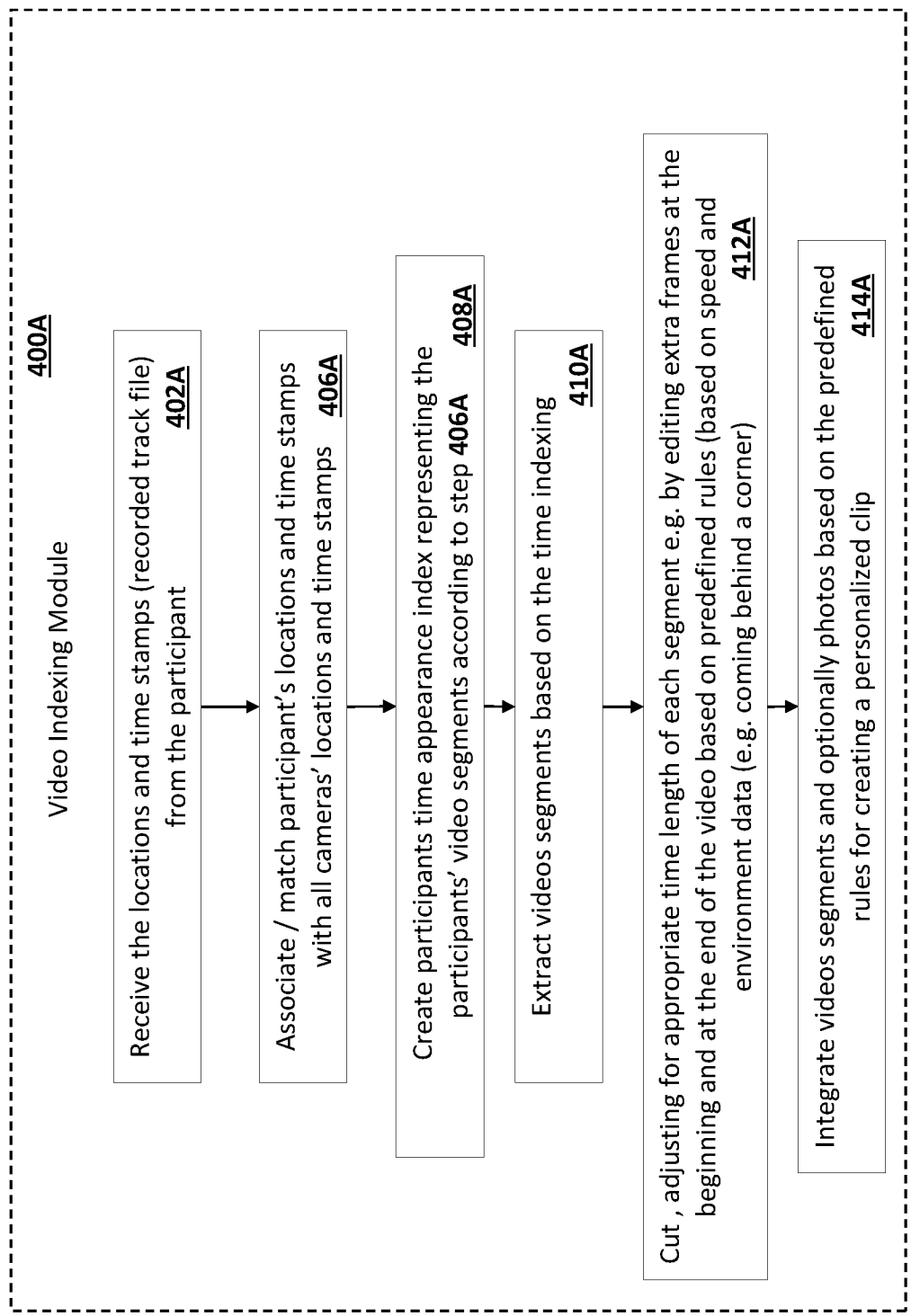
FIG. 10 is a flow chart illustrating the operational steps of an additional or alternative Video editing module processing, according to some embodiments of the invention.

FIG. 10 is a flow chart illustrating the operational steps of an additional or alternative video indexing module 400A according to some embodiments of the invention. This process includes the following steps: receiving from the participant the locations and time stamps file (402A); Associating/Matching the participant's locations and time stamps with the cameras' locations and time stamps (406A); creating participants time appearance index representing the participants' video segments according to step 406A (step 408A) (see in FIG. 8 is an example of the indexing); extracting video segments based on the index (step 410A); cutting and adjusting for appropriate time length for each segment by adding extra frames at the beginning and the end of the video based on predefined timing rules, considering speed of the participant and environment characteristics, such as participant appearing behind the corner (412A); and integrating video segments and optionally photos/images based on the predefined rules to create a personalized edited clip (step 414A).

It will be appreciated that the event may be captured and/or filmed by at least one camera.

As mentioned before, when a participant wishes for the system to create his clip, he may register using Facebook™ by providing the identification number (46 of FIG. 1) associated with his barcode and, according to embodiments of the invention, provide his locations and time stamps file. The system locates the user's video segments and integrates them in a video clip template. The video clip template may be prepared for each event or may be intended to allow modification as necessary. Each template may comprise generic parts which appear in each user's video clip and at least one "placeholder" for the system to integrate the user's video segment(s) into. The generic parts are video clip in which the user does not necessarily appear. According to embodiments of the invention, the "placeholder" size may be dynamic. In case where the "placeholder" size is fixed, the system may edit the user's video segments to fill the "placeholder". For example, if the "placeholder" length is nine seconds and the user's video segment length is e.g. six seconds, the system may pad the extra three seconds with another video segment of the user or with a generic content. In another case where the "placeholder" length is e.g. nine seconds and the user's video segment length is e.g. fifteen seconds, the system may, for example:

Cut the first six seconds of the segment;
Cut the last six seconds of the segment;

Find the frame where e.g. the sky's pixels appear the least, namely, the user's body is the biggest, thus covering part of the sky's pixels, and use the frames spanning four and a half seconds before and after this frame, etc.

According to embodiments of the invention, the system holds information regarding the chronological order of the segments in order to avoid cases where the video clip is created using a later frame before an earlier one.

According to embodiments of the invention, the system may also integrate into the video clip the user's name and photo fetched from the user's Facebook™ page, photos of the user from the event, speed and area map.

Figure 7:
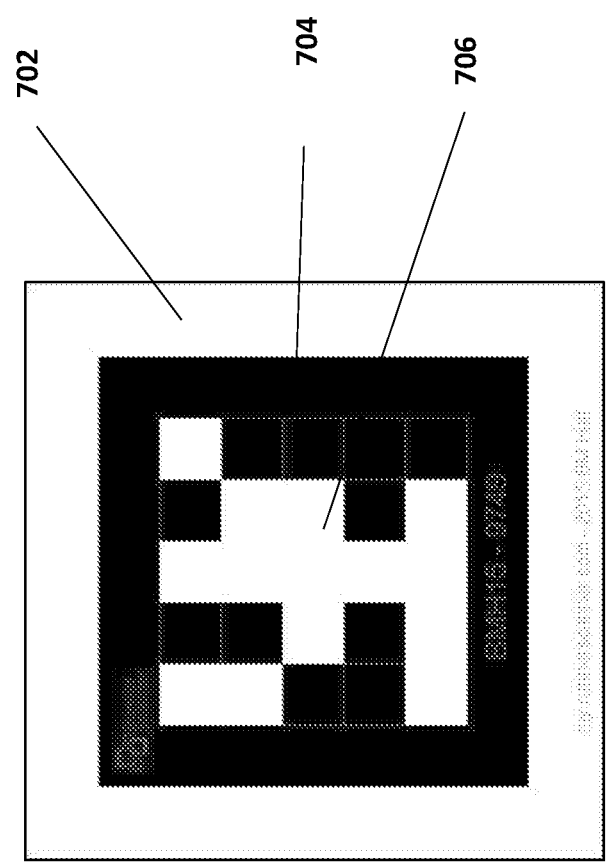
FIG. 7 is an illustration of an exemplary identification sign, according to some embodiments of the invention.

FIG. 7 is an illustration of an exemplary identification sign, according to some embodiments of the invention. The identification sign includes, for example, a white frame 702 and a black background 704 surrounding the 2D barcode pattern 706, which enables to detect the barcode pattern and therefore the participant associated therewith, when capturing the image from a great distance.

FIG. 8 is an illustration of an exemplary time appearance index table, according to some embodiments of the invention. This table includes for each participant ID, the starting time in which the participants first appeared, in any video segment, the end time of the last appearance of the user and his geographical location at each video segment.

According to embodiments of the invention, instead of or in addition to the sign identification module 100, the barcode pattern reader module 200 and the 2D barcode pattern generator 250, the system may use, for the process of recognizing the participants, a face detection and recognition process. According to embodiments of the invention, the system may scan participants' photos, such as for example by extracting the participant's images from his Facebook™ accounts in order to learn and analyze participants' characteristics (e.g. face ratios and/or patterns such as presented in FIG. 13). The photo organization module 300B (of FIG. 11) and the video indexing module 400B (of FIG. 12) may use these photos and patterns for recognizing participants using face detection and recognition process instead or in addition to the recognition using barcodes.

Figure 11:
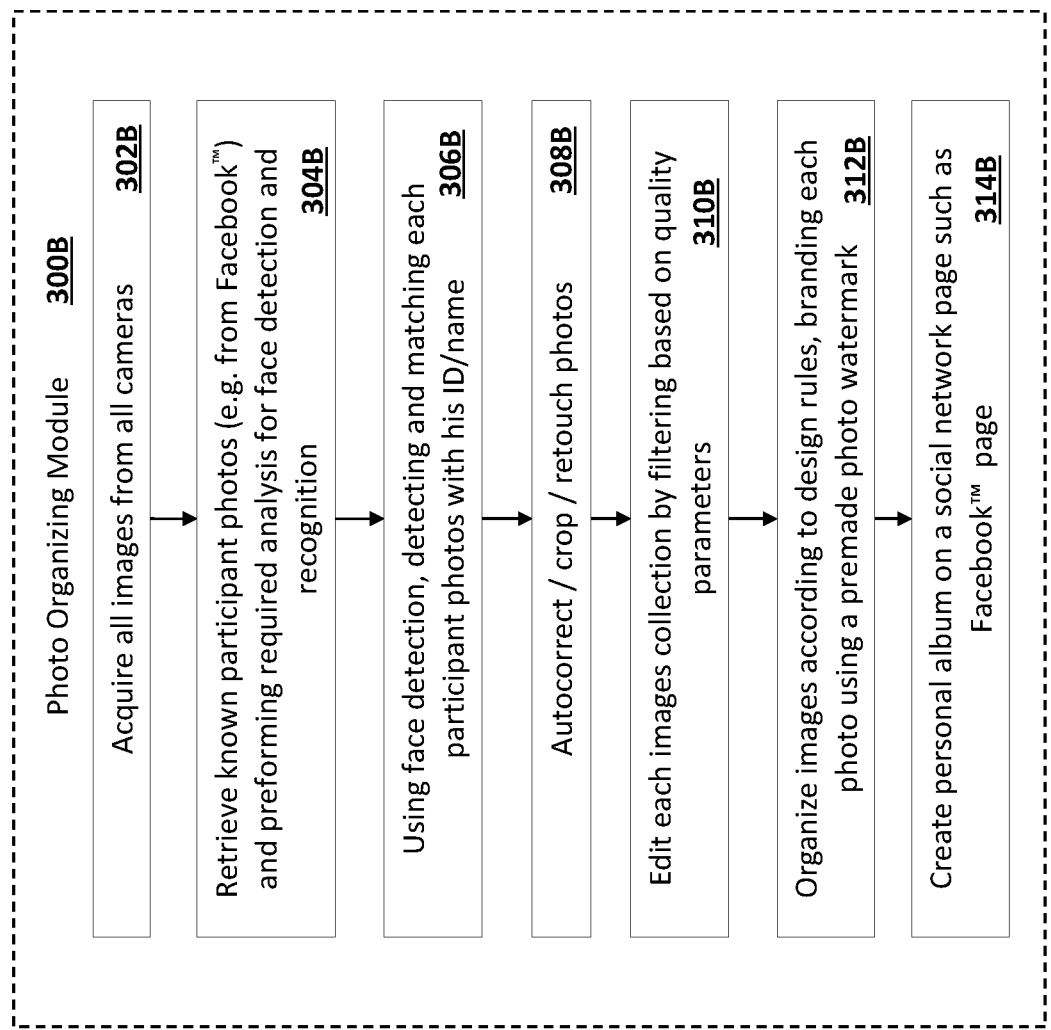
FIG. 11 is a flow chart illustrating the operational steps of an additional or alternative Photo organizing module processing, according to some embodiments of the invention.

FIG. 11 is a flow chart illustrating the operational steps of an additional or alternative photo organizing module 300B, according to some embodiments of the invention. This process includes the following steps: acquiring all images from all the cameras (step 302B); retrieving known participant photos (e.g. from Facebook™) and learning and analyzing participants' characteristics (e.g. face ratios and/or patterns such as presented in FIG. 13) required for face detection and recognition (step 304B); using face detection and recognition, detecting and associating each participant's photos with his ID/name (step 306B), optionally autocorrecting and cropping images (step 308B); editing each image collection by filtering images based on predefined filtering rules (step 310B); organizing images according to pre-defined design rules and branding each image using a premade photo watermark (step 312B) and optionally creating a personal photo album on a social network page such as Facebook™ (step 314B).

Figure 12:
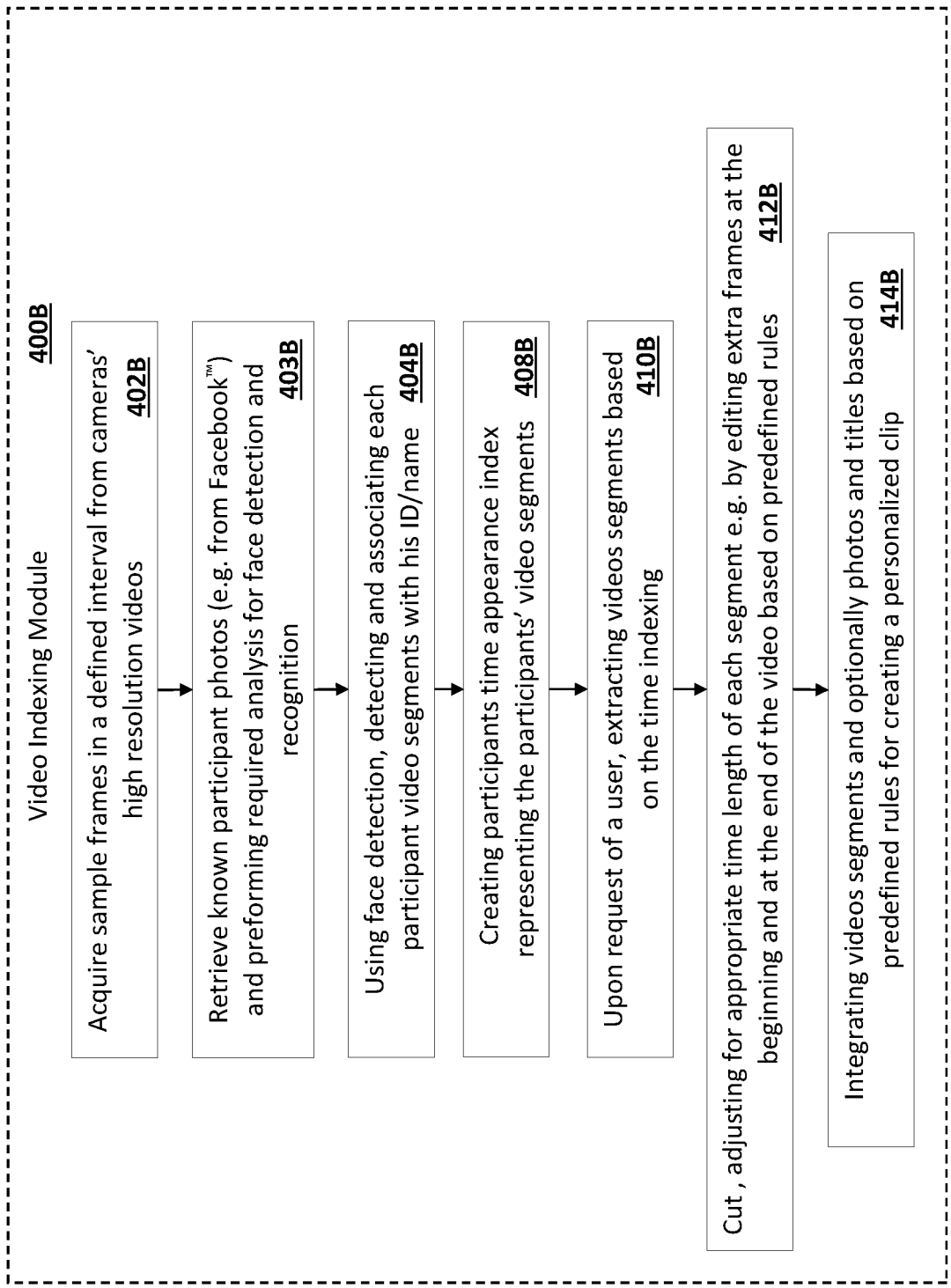
FIG. 12 is a flow chart illustrating the operational steps of an additional or alternative Video editing module processing, according to some embodiments of the invention.

FIG. 12 is a flow chart illustrating the operational steps of an additional or alternative video indexing module 400B according to some embodiments of the invention. This process includes the following steps: acquiring sample frames in a defined interval from the cameras' videos (step 402B); retrieving known participant photos (e.g. from Facebook™) learning and analyzing participants' characteristics (e.g. face ratios and/or patterns such as presented in FIG. 13) required for face detection and recognition (step 403B);

using face detection and recognition, detecting and associating each participant's photos with his ID/name (step 404B); creating participants time appearance index representing the participants' video segments (step 408B) (see in FIG. 8 is an example of the indexing); upon request of a user (participant) to create his video clip, extracting video segments based on the time index (step 410B); cutting and adjusting for appropriate time length for each segment by adding extra frames at the beginning and the end of the video based on predefined timing rules (412B); and integrating video segments and optionally photos/images based on the predefined rules to create a personalized edited clip (step 414B).

According to embodiments of the invention, in the step of learning and analyzing participants' characteristics, the system may present the user with at least one retrieved photo of himself and ask him to identify himself in this (these) photo(s).

It will be appreciated that the photo album and the video clip do not have to be created only upon request. The system may create the photo albums and/or the video clips of all or at least part of the participants in advance.

Figure 13:
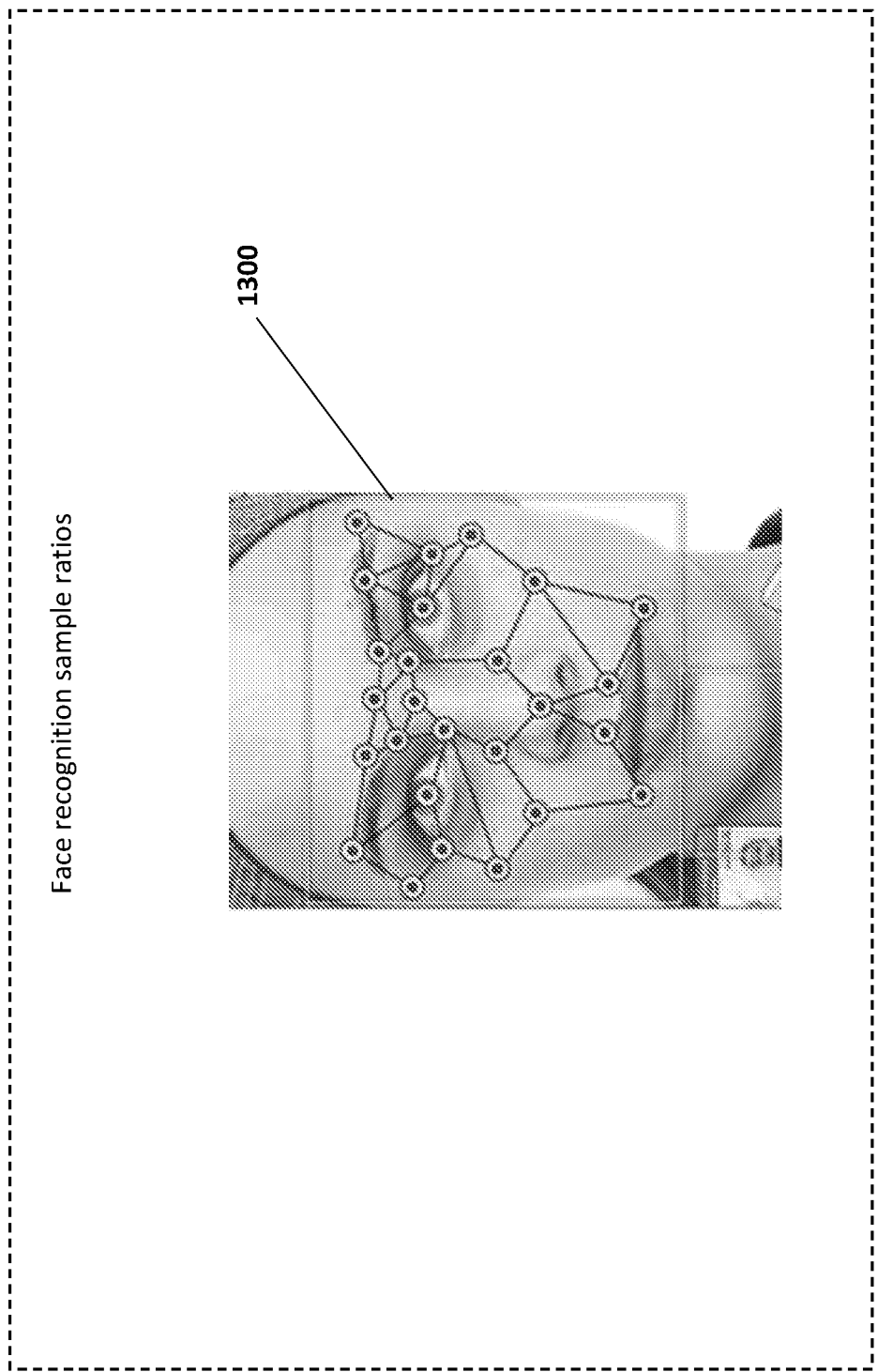
FIG. 13 is an illustration of an exemplary face detection and recognition sample pattern.

FIG. 13 is an illustration of an exemplary face detection and recognition sample pattern.

It will be appreciated that the system of the present invention refers to recognizing and creating video clips for participants but is not limited to only recognizing and creating video clips for participants. The system may also be configured to recognize and create video clips for vehicles, motorcycles, boats or any other moving object.

It will be appreciated by persons skilled in the art that the present invention is not limited to what has been particularly shown and described hereinabove. Rather the scope of the present invention is defined by the appended claims and includes combinations and sub-combinations of the various features described hereinabove as well as variations and modifications thereof which would occur to persons skilled in the art upon reading the foregoing description.

The invention claimed is:

1. A method of analyzing and presenting at least one video of a user in a comprehensive personal clip of said user's participation in an event, wherein said comprehensive personal clip comprises a template comprising at least one generic video and at least one placeholder;
said method comprises:
providing each user of said event with an identification sign;
creating a lookup table of users' IDs, each user's ID being associated with said user's identification sign;
receiving at least one video of said event;
extracting sample frames from said at least one video of said event in an initial predetermined rate;
detecting and identifying at least one identification sign in said sample frames and creating a time appearance index representing at least one user's at least one video segment, according to said at least one identified identification sign and wherein said predetermined rate may be lowered if in the step of detecting and identifying no identification sign has been detected in at least five consecutive sample frames;
calculating a user's speed based on respective sizes of said user's identification sign in at least two consecutive detected frames;
editing at least one of said at least one video segment that features at least one of said users and background pixels;
wherein said editing comprises one of:
finding a frame where said background pixels appear the least; and
finding a frame where said identification sign appears the largest; and
integrating said at least one edited video segment into a comprehensive personal clip; wherein said integrating comprises integrating said found frame and frames spanning at least one of said at least one placeholder before and after said found frame;
wherein the steps of creating, extracting, detecting and identifying, editing and integrating are performed by at least one processor unit.

2. The method of claim 1, wherein said identification sign comprises one of barcode, QR code, data matrix, code and pattern.

3. The method of claim 1, wherein said identification sign comprises at least one unique two-dimensional (2D) barcode pattern and at least one predesigned common pattern.

4. The method of claim 3, wherein said unique 2D barcode pattern comprises a unique combination of pixels for each of said users participating in said event.

5. The method of claim 3, wherein said predesigned common pattern comprises a bright frame and a dark frame.

6. The method of claim 3, wherein said predesigned common pattern comprises orientation marks.

7. The method of claim 6, wherein said orientation marks comprise a top right white pixel, a top left white pixel, a bottom left white pixel and a bottom right black pixel.

8. The method of claim 1, wherein said editing comprises adding at least one extra frame at least one of the beginning and end of at least one of said at least one video segment.

9. The method of claim 1, wherein said editing comprises cutting at least one frame from at least one of the beginning and end of at least one of said at least one video segment.

10. The method of claim 1, wherein said editing comprises enlarging a determined area of at least one of said at least one video segment.

11. The method of claim 1, further comprising integrating at least one of said at least one video segment into at least one of said at least one placeholder.

12. The method of claim 1, further comprising integrating at least one of said user's social network user name and photo, photos from said event, speed and area map.

13. The method of claim 1, wherein said predetermined rate may be changed.

14. The method of claim 1, wherein said creating a time appearance index comprises determining whether a frame belongs to an existing video segment or should be part of a new video segment.

* * * * *